US012434609B2

(12) United States Patent
Ashman et al.

(10) Patent No.: US 12,434,609 B2
(45) Date of Patent: Oct. 7, 2025

(54) VEHICLE SHIELDS AND SUPPORTS

(71) Applicant: AC GLOBAL SYSTEMS LTD., Trail (CA)

(72) Inventors: Danny Nathan Ashman, Montrose (CA); Shaun Patrick Ashman, Mansfield, TX (US)

(73) Assignee: AC GLOBAL SYSTEMS LTD., Trail (CA)

( * ) Notice: Subject to any disclaimer, the term of this patent is extended or adjusted under 35 U.S.C. 154(b) by 371 days.

(21) Appl. No.: 17/999,161

(22) PCT Filed: May 21, 2021

(86) PCT No.: PCT/IB2021/054445
§ 371 (c)(1),
(2) Date: Nov. 17, 2022

(87) PCT Pub. No.: WO2021/234664
PCT Pub. Date: Nov. 25, 2021

(65) Prior Publication Data
US 2023/0191971 A1 Jun. 22, 2023

Related U.S. Application Data

(60) Provisional application No. 63/029,159, filed on May 22, 2020, provisional application No. 63/055,473, filed on Jul. 23, 2020.

(30) Foreign Application Priority Data

May 22, 2020 (CA) .................... CA 3081310

(51) Int. Cl.
*B60R 21/06* (2006.01)
*B60N 2/90* (2018.01)
*B60R 13/08* (2006.01)

(52) U.S. Cl.
CPC ............ *B60N 2/91* (2018.02); *B60R 21/06* (2013.01); *B60R 13/0823* (2013.01)

(58) Field of Classification Search
CPC ......... B60N 2/91; B60R 21/06; B60R 21/026; B60R 21/12; B60R 13/0823; B62D 33/042; B61D 45/006; B60P 7/14
(Continued)

(56) References Cited

U.S. PATENT DOCUMENTS 5,382,068 A * 1/1995 Simmons ............ B60R 13/0823
160/327
6,669,259 B2 * 12/2003 Murray ................ B60R 21/026
296/24.46
(Continued)

FOREIGN PATENT DOCUMENTS

DE 102015004813 12/2015
DE 102021107565 A1 * 9/2022
GB 2250485 A * 6/1992 ........... B60R 21/026

OTHER PUBLICATIONS

NPL—Ovege—Car Divider Curtain—Amazon 03112020 https://www.amazon.com/Ovege-Curtains-Shade-Privacy-Detachable-Black-Silky/dp/B09QHKW9MR/ (Year: 2020).*
(Continued)

*Primary Examiner* — Amy R Weisberg
*Assistant Examiner* — Wenwei Zhuo
(74) *Attorney, Agent, or Firm* — DLA PIPER LLP (US)

(57) ABSTRACT

An example of an apparatus is provided. The apparatus includes a mount to secure in a vehicle. The mount includes a first lip to insert into a first gap and a first surface to brace against a first wall. The apparatus further includes an additional mount to secure in the vehicle. The additional mount includes a second lip to insert into a second gap and a second surface to brace against a second wall. The second gap is opposite the first gap and the second wall is opposite the first
(Continued)

wall. Furthermore, the apparatus includes a support member supported by the mounts at each end. In addition, the apparatus includes a barrier structure supported by the support member wherein the barrier structure is to separate a first occupant of the vehicle from a second occupant of the vehicle.

19 Claims, 17 Drawing Sheets

(58) Field of Classification Search
USPC .......... 296/24.4, 24.41, 24.42, 24.43, 24.46; 280/749; 410/118, 129
See application file for complete search history.

(56) References Cited

U.S. PATENT DOCUMENTS

| | | | |
|---|---|---|---|
| 10,696,187 B2 | 6/2020 | Lalague | |
| 11,027,673 B1* | 6/2021 | Abdelrahman | B60R 21/026 |
| 11,458,919 B2* | 10/2022 | Porter | B60R 21/026 |
| 11,851,016 B2* | 12/2023 | Erlacher | B62D 31/025 |
| 12,036,935 B1* | 7/2024 | Home | B60R 21/026 |
| 2003/0090119 A1* | 5/2003 | Bateman | B60R 21/06 296/24.43 |
| 2010/0201148 A1* | 8/2010 | Storer | B60R 21/12 296/24.46 |
| 2012/0217765 A1 | 8/2012 | Michael et al. | |
| 2014/0252791 A1* | 9/2014 | Renforth | B60R 21/12 296/24.31 |
| 2016/0355109 A1* | 12/2016 | Geraty | B60N 2/90 |
| 2018/0056847 A1* | 3/2018 | Cavalieri | B60P 7/0876 |
| 2018/0312082 A1* | 11/2018 | Lalague | B60N 2/01 |
| 2020/0391666 A1* | 12/2020 | Weyrauch | B60R 21/026 |
| 2021/0155187 A1* | 5/2021 | Vite Cadena | B60R 21/026 |
| 2021/0331613 A1* | 10/2021 | Tignanelli | B60R 21/02 |
| 2021/0331629 A1* | 10/2021 | Marroquin | B60R 13/0823 |
| 2021/0347324 A1* | 11/2021 | Borgsdorf | B60R 21/06 |
| 2022/0097639 A1* | 3/2022 | McClymont | B60R 21/026 |
| 2022/0185217 A1* | 6/2022 | Chupin | B60R 21/026 |

OTHER PUBLICATIONS

PCT International Application No. PCT/IB2021/054445, International Search Report, dated Aug. 12, 2021, 4 pages.

* cited by examiner

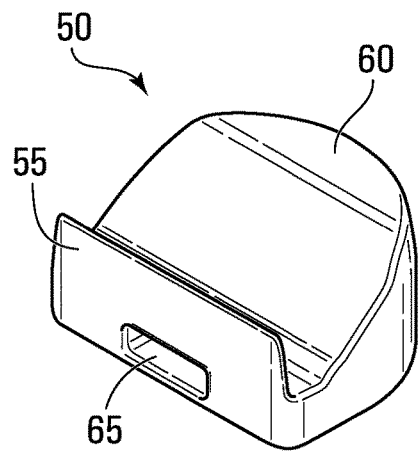
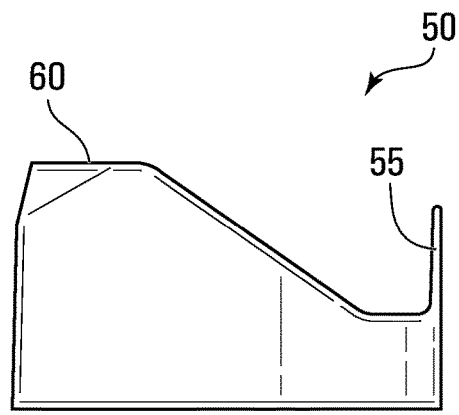
FIG. 1A
FIG. 1B
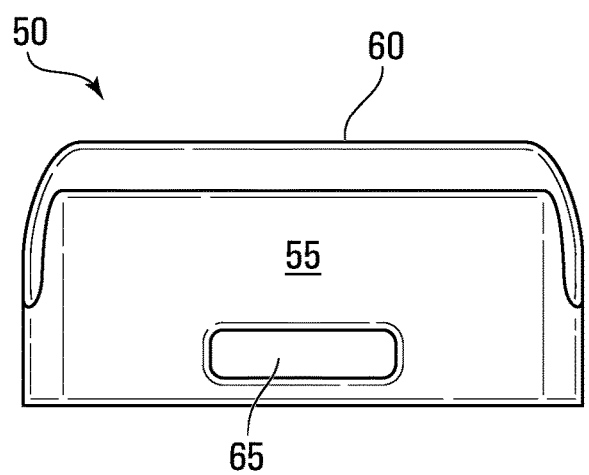
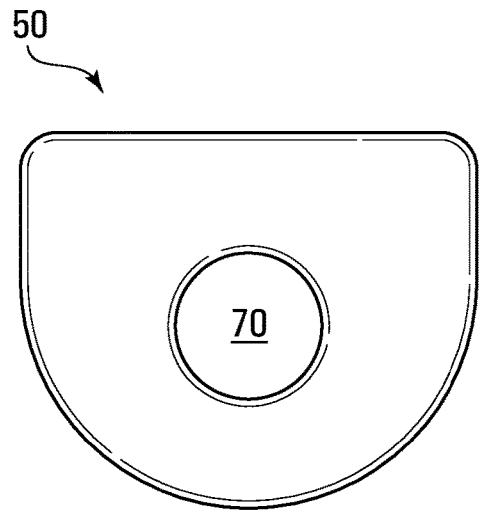
FIG. 1C
FIG. 1D

VEHICLE SHIELDS AND SUPPORTS

CROSS-REFERENCE TO RELATED APPLICATION

This application is a Nation Stage of PCT/IB2021/054445, filed May 21, 2021, which claims the benefit of CA Patent Application No. 3,081,310, filed May 22, 2020, U.S. Provisional Patent Application No. 63/029,159, filed May 22, 2020, and U.S. Provisional Patent Application No. 63/055,473, filed Jul. 23, 2020, which are incorporated by reference in their entireties.

BACKGROUND

Vehicles are used to transport individuals in a wide variety of applications. In some instances, vehicles may group multiple individuals within the same vehicle, such as in a car. More specialized vehicles may also carry more than one person at a time, such as a golf cart, a bus, a truck, a taxi, a rideshare vehicle, a shuttle, a train, or an aircraft.

Dividers may be used to separate individuals in the same vehicle for various reasons. Plexiglass shields may be commonly installed in taxicabs or police vehicles, for the purpose of creating a barrier between the driver and the passenger in the backseat of the vehicle. Such barriers, for example, may prevent the rear seat passenger from spitting on, or otherwise attacking, the driver.

SUMMARY

In accordance with an aspect of the invention, an apparatus is provided. The apparatus a lip to insert into a gap. The apparatus further includes a surface to brace against a wall. In addition, the apparatus includes a first depression to receive a first support member. Furthermore, the apparatus includes a second depression to receive a second support member. At least one of the first support member and the second support member are to support a shield device.

The first depression may be to receive an end of a support member or rib. The support member may be manufactured from one or more materials such as plastic, metal, resin, or glass.

The second depression may be to receive an end of a support rod. The support rod may be manufactured from one or more materials such as plastic, metal, and resin. The support rod may include additional components such as a telescoping mechanism and a biasing element in combination with the telescoping mechanism.

In accordance with another aspect of the invention, a barrier structure is provided. The barrier structure may be a shield. The barrier structure may be made from a pliable material. The barrier structure may be secured to a support member by a hook-and-pile fastener and/or an adhesive material. The barrier structure may also include a message center.

BRIEF DESCRIPTION OF THE DRAWINGS

Reference will now be made, by way of example only, to the accompanying drawings in which:

FIG. 1A is a view of an example of a mount to support a barrier structure;

FIG. 1B is a side view of the mount to support a barrier structure shown in FIG. 1A;

FIG. 1C is a front view of the mount to support a barrier structure shown in FIG. 1A;

FIG. 1D is a top view of the mount to support a barrier structure shown in FIG. 1A;

DETAILED DESCRIPTION

Figure 2A:
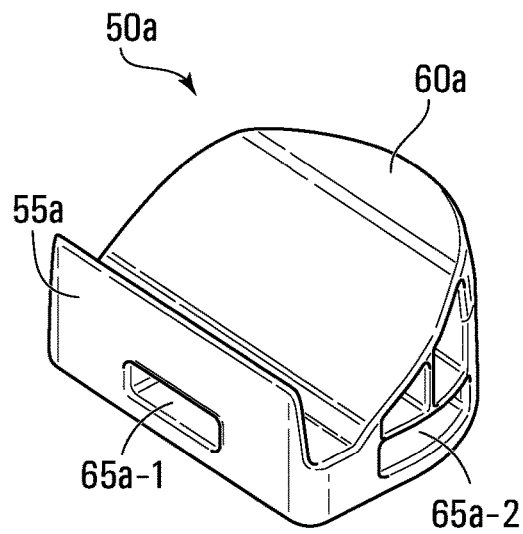
FIG. 2A is a view of another example of a mount to support a barrier structure.
Figure 2B:
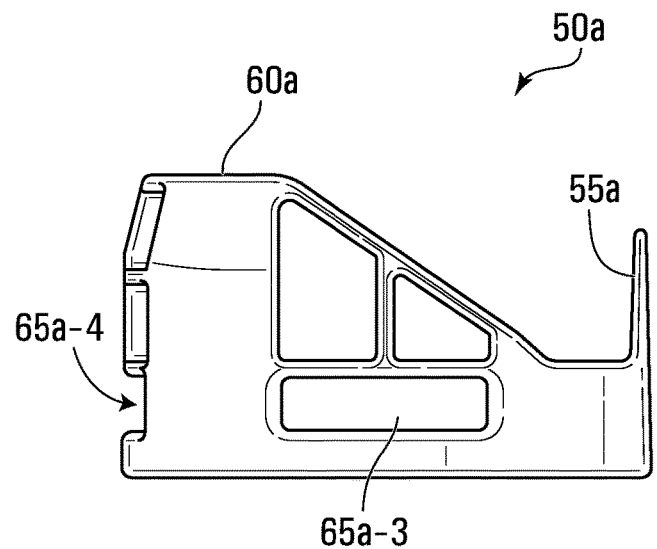
FIG. 2B is a side view of the mount to support a barrier structure shown in FIG. 2A.
Figure 2C:
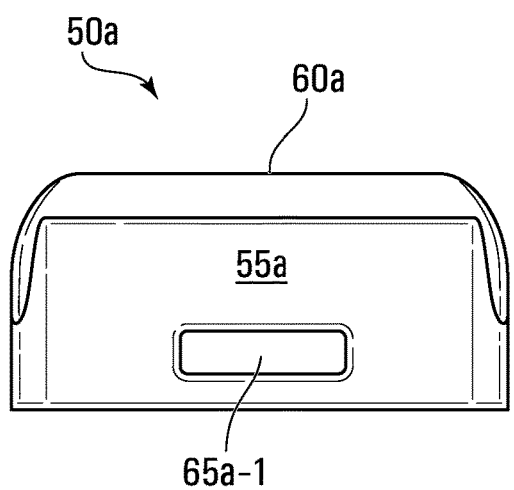
FIG. 2C is a front view of the mount to support a barrier structure shown in FIG. 2A.
Figure 2D:
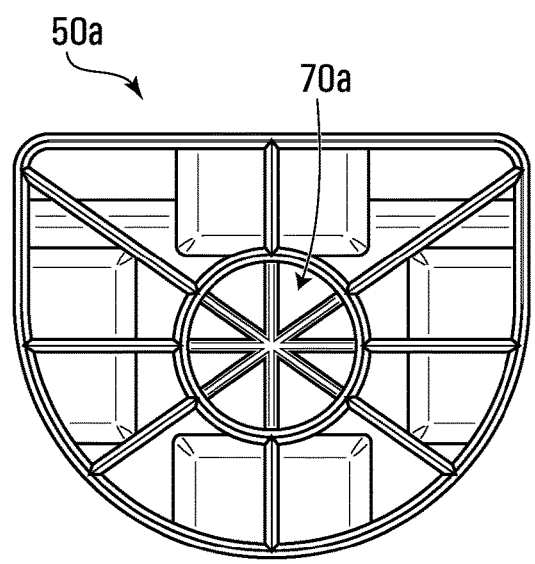
FIG. 2D is a top view of the mount to support a barrier structure shown in FIG. 2A.

As used herein, any usage of terms that suggest an absolute orientation (e.g. "top", "bottom", "up", "down", "left", "right", "low", "high", "front", "back", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Protective barriers to separate people who may be physically close to other people, such as when travelling together in a vehicle, are available as either personal protective equipment worn by an individual, such as facial masks or shields to cover the mouth and nose, or dividers installed in a vehicle, such as a plexiglass divider commonly found in police cars, buses, or some taxicabs to separate individuals from the operator of the vehicle. During a pandemic, an epidemic, or outbreak of pathogens, a protective barrier may be used to reduce the spread of pathogens via droplets expelled by that person to another person and thus reduce the probability of transmitting a pathogen between the persons.

It is to be appreciated that in some cases, non-medical personal protective equipment may not significantly reduce the exposure for the person wearing when they are wearing the mask. In particular, if a person wearing personal protective equipment is travelling in close proximity to another who is not wearing personal protective equipment, such as a mask, the person wearing non-medical personal protective equipment may have a limited reduction to the probability of catching a virus. In addition, non-medical personal protective equipment may not be readily available to some people at the moment people realize they are in close proximity to other individuals. In addition, personal protective equipment may also be used incorrectly and thus reduce or eliminate the effectiveness of the personal protective equipment.

An apparatus is provided to be easily installed in a wide variety of settings to erect physical barriers between people to reduce the ability for droplets to travel across the barrier. In particular, the apparatus may be easily manufactured and used across a wide variety of applications, such as in a various types of vehicles.

Referring to FIGS. 1A, 1B, 10, and 1D, different views of a mount 50 to support a barrier structure is generally shown. It is to be appreciated by a person of skill with the benefit of this description that the mount 50 may include additional components, such as various addition attachment mechanism or structural features for engaging additional support structures. In addition, although the mount 50 may be configured to be a universal device capable of multiple application in multiple vehicles, the mount 50 may be manufactured in various sizes. In the present example, the mount 50 includes a lip 55, a surface 60 to brace against a wall of a vehicle, a depression 65 to receive a support member and another depression 70 to receive another support member.

The mount 50 is to provide an anchor point to support a support member from which a barrier structure or shield device may be mounted. The mount 50 is not particularly limited and may have a different shape or form factor to engage with an attachment point in a vehicle. In the present example, the mount 50 may be a unitary body. The material from which the mount 50 is constructed is not limited. The mount 50 may be made from a rigid plastic material which may be manufactured with injection molding techniques or three-dimensional printing. In other examples, the mount 50 may be made from metal, wood, glass, or other materials with properties that can provide sufficient mechanical support for the other components. Furthermore, although the mount 50 is a unitary piece in the present example, other examples may be constructed from various parts that may be connected using fasteners or snapped together using tabs, adhesives, or a friction fitting.

In the present example, the lip 55 and the surface 60 are to engage a gap and a wall below the gap, respectively. The lip 55 and the surface 60 are to cooperate to secure the mount 50 on the gap and wall combination using a friction fit without use of any adhesives or fasteners to allow for mounting and demounting without leaving any permanent markings. In particular, the lip 55 may be inserted into a gap while the surface 60 braces against the wall proximate to the gap. Accordingly, the lip 55 is to be secured within the gap in a manner that can be easily removed and reinserted.

In some examples, a non-marking adhesive may be applied to either the lip 55 or the surface 60 to enhance the securing of the mount 50 to the wall. Alternatively, a magnet may be disposed in the mount 50 to engage complementary magnet materials in the wall to enhance the mounting of the mount 50. In further examples where a permanent mark on the wall is not an issue, a fastener such as a nail, a staple, a rivet, a snap fastener, or a screw may be used.

The location within a vehicle where the mount 50 is to be mounted is not limited. In addition, the mount 50 may be mounted on different types of vehicles. In the present example, the mount 50 is to be mounted at a gap formed between interior panels of the vehicle. In particular, the lip 55 may be inserted into the gap between the panels and the surface 60 may brace against a lower panel due to gravity. The mount 50 may be mounted in any gap of the vehicle. For example, if the vehicle is an automobile, the mount 50 may be mounted by inserting the lip into a gap between the headliner and another panel. As a specific example, to position a barrier structure between the front row of an automobile and the rear row, the mount 50 may be mounted on each of the B-pillars by inserting the lip 55 between the gap formed by the B-pillar panel and the headliner. Accordingly, a support member may then be supported across the automobile to separate the front row from the rear row of seating.

The depressions 65 and 70 are to receive support members. In particular, the depressions are to receive one end of a support member that is otherwise partially supported elsewhere. It is to be appreciated that the depression 65 and the depression 70 are to receive separate support members. Furthermore, it is to be understood that although the depressions 65 and 70 provide a mechanism to support a support member, a barrier structure may not use two support members and that either or both of the depression 65 or depression 70 may receive a support member. In other examples, the barrier structure may be supported by a single support member, or multiple barrier structures may be supported by one or more of the support members.

In the present example, the depression 65 is a slot to receive an end of a rib and the depression 70 is substantially circular to receive an end of a support rod. However, it is to be appreciated that the shape and depth of the depressions 65 and 70 are not particularly limited and may be other shapes, such as square, rectangular, hexagonal, or irregularly shaped, to mate with a complimentary support bar. The support members are also not particularly limited and may be made from various plastics, metal, wood, glass, or other material with properties that can provide sufficient mechanical support for the barrier structure. In some examples, the support member may include multiple components to provide additional functionality, such as a sliding mechanism and/or a spring to provide a telescoping feature.

It is to be appreciated by a person of skill with the benefit of this description that the mount 50 may be mounted on any wall in a vehicle above which a gap can provide a friction fit for the lip 55. As discussed above, the mount 50 may be used on the B-pillars of an automobile to support a support member across the automobile from which a barrier structure may hang between the front area of the automobile and the rear area of the automobile. Although the present example provides a specific mounting mechanism for fast installation and removal against a wall of a vehicle without leaving marks, other applications are contemplated. In another example, the mount 50 may be mounted onto a flat surface on by applying an adhesive or other attachment mechanism, such as a hook-and-pile fastener, to the flat face of the mount 50 on which the depression 70 is disposed. In such an application, the depression 65 may still be used to support a support member, such as a rib. In a further example, the mount 50 may also include a suction device for attaching to a window. Accordingly, the mount 50 may be mounted in most locations to provide support members for a barrier structure.

Various advantages will now become apparent to a person of skill in the art. For example, the mount 50 provides a mechanism to mounting and demounting a barrier structure. This provides the ability to install the barrier structure to separate the passengers in a vehicle, such as strangers, to reduce the probability of virus spread or the spread of any other respiratory pathogen. The mount 50 also provides the ability to remove the barrier structure quickly without leaving markings on the vehicle, such as for cleaning purposes or if the expected passengers are not to be separated, such as family members where risk of virus spread is not substantially increased with interactions in a vehicle.

Referring to FIGS. 2A, 2B, 2C, and 2D, another example of a mount 50a to support a barrier structure or shielding device is generally shown. Like components of the mount 50a bear like reference to their counterparts in the mount 50, except followed by the suffix "a". The mount 50a includes a lip 55a, a surface 60a to brace against a wall of a vehicle, depressions 65a-1, 65a-2, 65a-3, and 65a-4 (generically, these depressions are referred to herein as "depression 65a" and collectively they are referred to as "depressions 65a") to receive a support member and another depression 70a to receive another type of support member.

In the present example, the mount 50a includes a plurality of depressions 65a in the shape of a slot disposed on four sides of the mount 50a. It is to be appreciated by a person of skill that the additional depressions 65a allow for additional support members to be connected to the mount 50a. This may provide for addition barrier structures to be put in place perpendicular to each other, such as for larger vehicles where more barrier structures are to be installed.

Figure 3A:
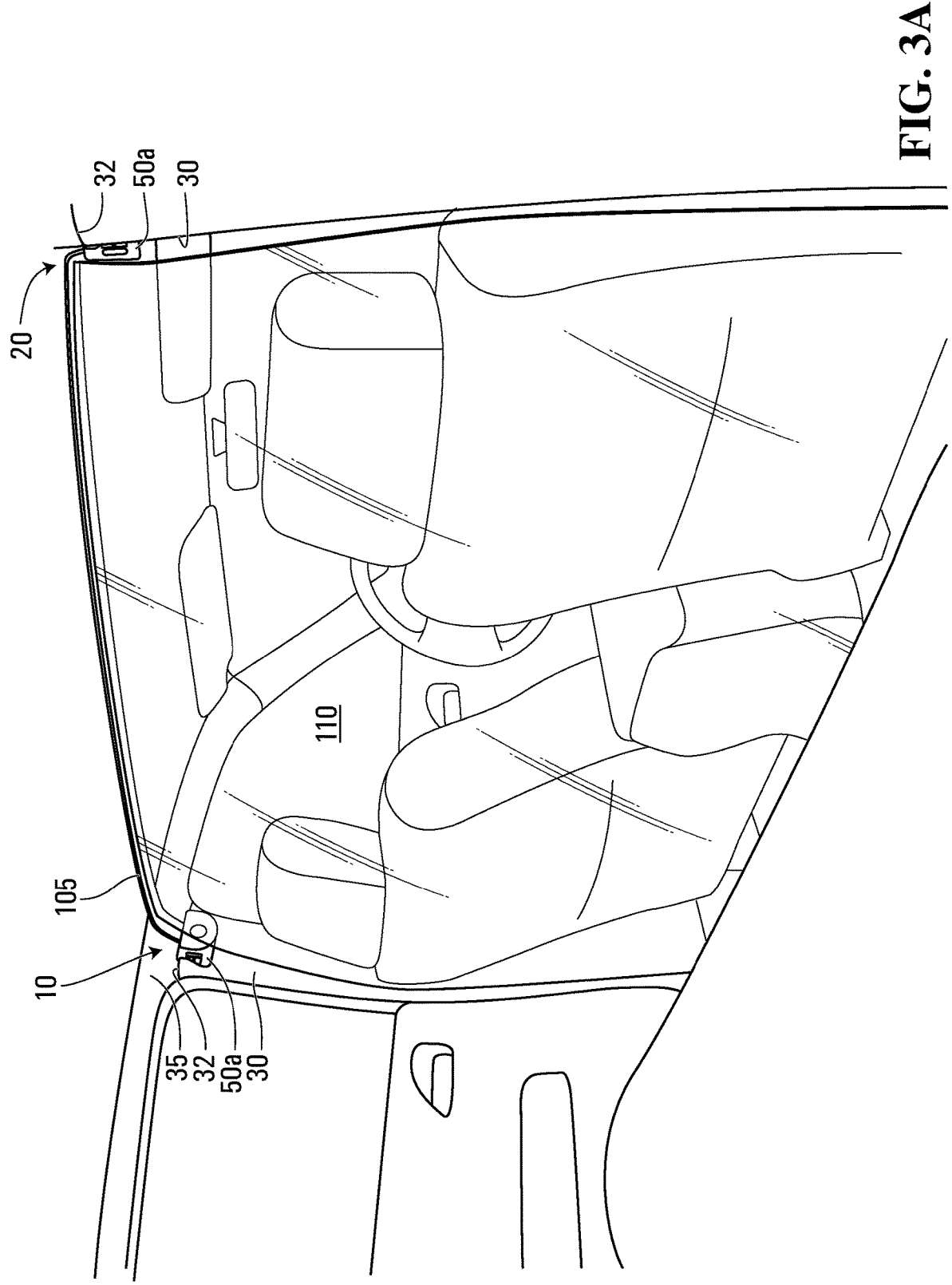
FIG. 3A is a representation of an example of an apparatus to reduce airflow between occupants in a vehicle.
Figure 3C:
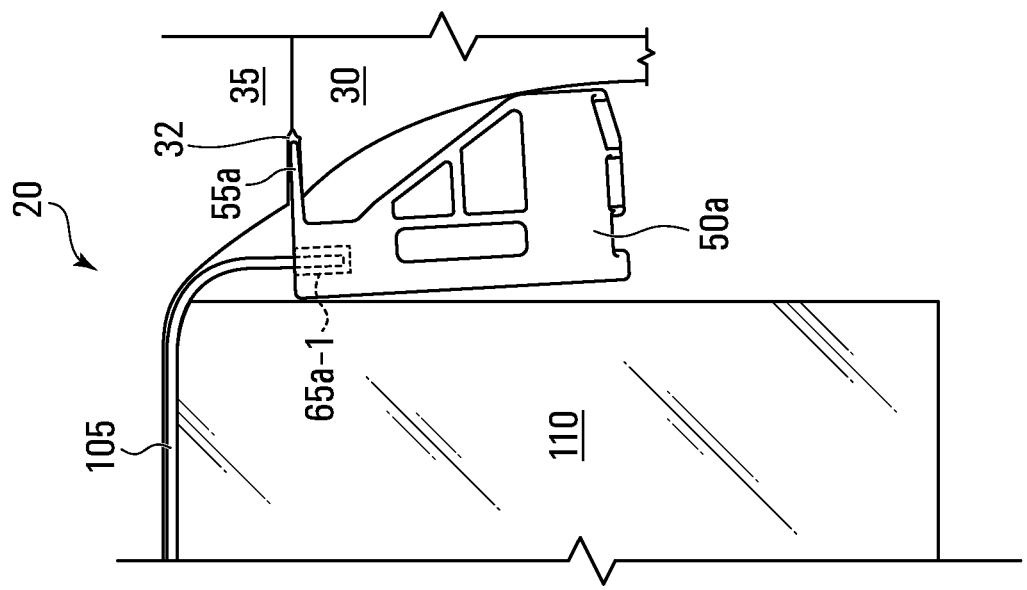
FIG. 3C is zoomed in view of another portion of the apparatus to reduce airflow between occupants in a vehicle shown in FIG. 3A.
Figure 3B:
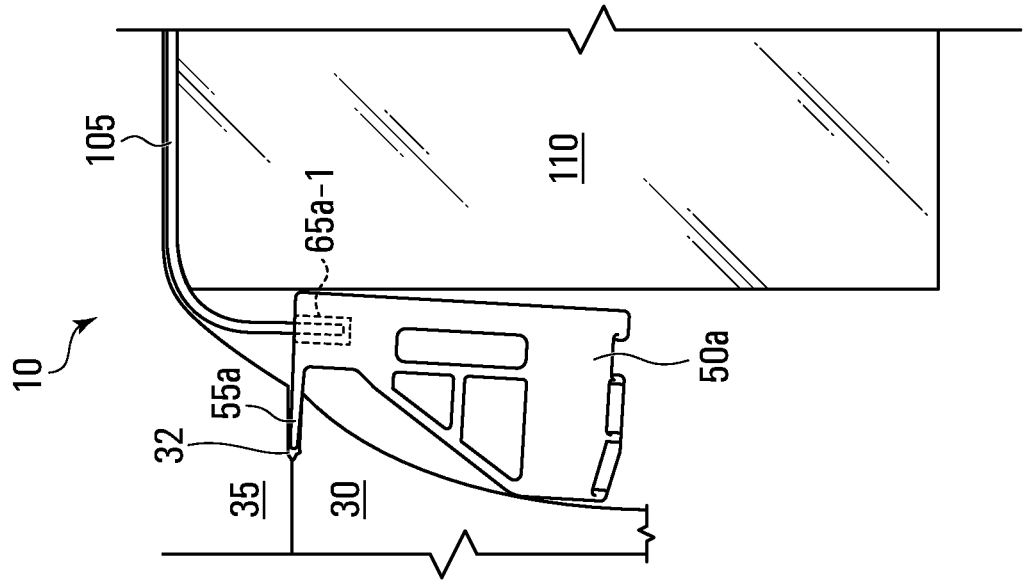
FIG. 3B is zoomed in view of a portion of the apparatus to reduce airflow between occupants in a vehicle shown in FIG. 3A.

Referring to FIGS. 3A, 3B, and 3C, an example of an apparatus 100 to separate occupants to reduce airflow between occupants in a vehicle is shown. It is to be appreciated that the apparatus is an example application of the mount 50a discussed above. In the present example, the apparatus 100 includes mounts 50a, a support member 105, and a barrier structure 110.

The mounts 50a are the mounts described above. In the present example, the apparatus 100 includes two mounts 50a. It is to be appreciated by a person of skill with the benefit of this description that the apparatus 100 may be modified to include more than two mounts. For example, the support member 105 may have a mount 50a between the end mounts 50a in examples where the support member 105 is too long to be supported by the ends. Therefore, the support member 105 may be divided into two portions that can be supported between the two end mounts 50a with a midpoint mount 50a. The midpoint mount 50a may use the depressions 65a-2 and 65a-3 to support the midpoint of the support member 105.

In the example illustrated in FIG. 3A, the lip 55a of each mount 50a is inserted into the gap 32. The gap 32 is not particularly limited and in the present example, the gap 32 is formed between the interior panel 30 of a B-pillar of an automobile and the headliner 35 of the automobile. The headliner 35 also forms a gap 32 on the other side of the automobile at the interior panel 30 of the opposite B-pillar. In other examples, gaps between other panels may also be used if located in a position for supporting the barrier structure. When the lip 55a is inserted into the gap, the surface 60a rests against the interior panel 30 to secure the mount 50a in place. In the present example, the mounts 50a do not use a permanent or semi-permanent fastening mechanism or adhesives so that the mounts may be easily removed. The manner by which the mounts 50a are secured may include a friction fit within the gap 32 or the use of a magnet or other removeable fastener, such as a magnetic coupling or hook-and-pile fastener. Accordingly, the mounts 50a may be detached and mounted to install and remove the apparatus 100 as needed depending on the use of the vehicle for each trip.

In the present example, the mounts 50a are disposed on opposite sides of the vehicle, such as on opposite B-pillars of an automobile. Accordingly, the support member 105 may be used to suspend the barrier structure 110 across substantially the entire automobile to separate the front row of seats from a second or rear row of seats.

The support member 105 is not particularly limited. For example, the support member 105 may be a rib or a plastic strip with sufficient mechanical strength to span across the width of an automobile cabin. In other examples, the support member 105 may also be made from other materials such as plastic (including polyvinyl chloride and fiber glass), metal, resin, or glass. In the present example, the support member 105 is supported at each end by the mounts 50a. In the present example, each end of the support member 105 may be received in the depression 65a-1 of each mount 50a to secure and support the support member 105 across the automobile. The support member 105 may also use additional clips or fasteners into the headliner along its length to across the automobile for examples where the support member is not mechanically rigid enough to support the weight of the barrier structure 110 across the entire length. Furthermore, in some examples, the length of the support member 105 may also be adjustable to accommodate vehicles with different passenger compartment dimensions.

The support member 105 is to support the barrier structure 110 and to allow the barrier structure 110 to suspend of hang therefrom. The manner by with the barrier structure 110 is supported is not particularly limited. In the present example, the support member 105 may include a hook-and-pile fastener along the length or portions of the length to engage a complementary fastener along the top of the barrier structure 110. In other examples, the support member 105 may include clips, hooks, and/or magnetic fasteners to secure the barrier structure 110. Furthermore, in other examples, the barrier structure 110 may be integrally formed with the support member 105 or the barrier structure may include a hole through which the support member 105 may pass.

As mentioned above, the barrier structure 110 is to be supported by the support member 105 in the present example. The barrier structure 110 is not particularly limited and may be made of any material that is capable of separating occupants in the vehicle, such as the front and rear occupants. In particular, the barrier structure 110 is to reduce the airflow between occupants to reduce the likelihood of sharing air that may be contaminated. In some examples, the airflow into each compartment may be circulated through a filter as well to improve the air quality in the vehicle. In the present example, the barrier structure 110 is clear to allow the occupants to see each other. In other examples, the barrier structure 110 may also be tinted, translucent, or opaque to increase privacy among the occupants. The materials and design of the barrier structure 110 is not limited. For example, the barrier structure 110 may be a flexible sheet of plastic film in some examples that can collapse for easy storage when uninstalled and not in use. In other examples, the barrier structure 110 may be a piece of plastic, which may be solid and/or optionally foldable for storage when not in use. The materials from which the barrier structure 110 is made is not limited and may be made from various films, such as polyethylene, polypropylene, cellophane, polyvinyl chloride, or thermoplastic polyurethane. Further examples may include the barrier structure 110 being a substantially flexible plastic sheet with a rigid or semi-rigid frame. In other examples, the barrier structure 110 may also serve additional purpose and may have properties to provide privacy, noise dampening, or protection from projectiles such as a bullet proof film.

Figure 4A:
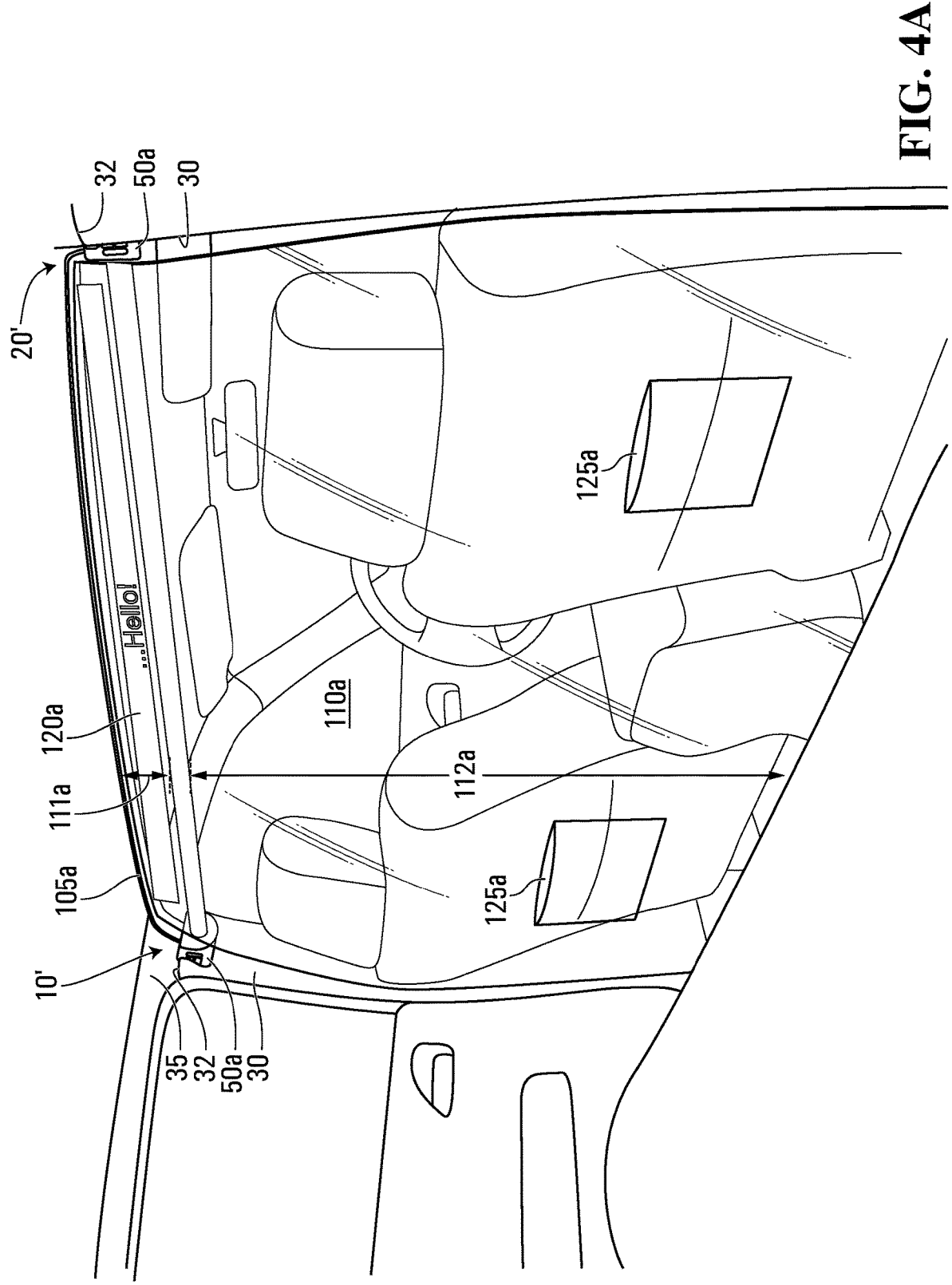
FIG. 4A is a representation of another example of an apparatus to reduce airflow between occupants in a vehicle.
Figure 4C:
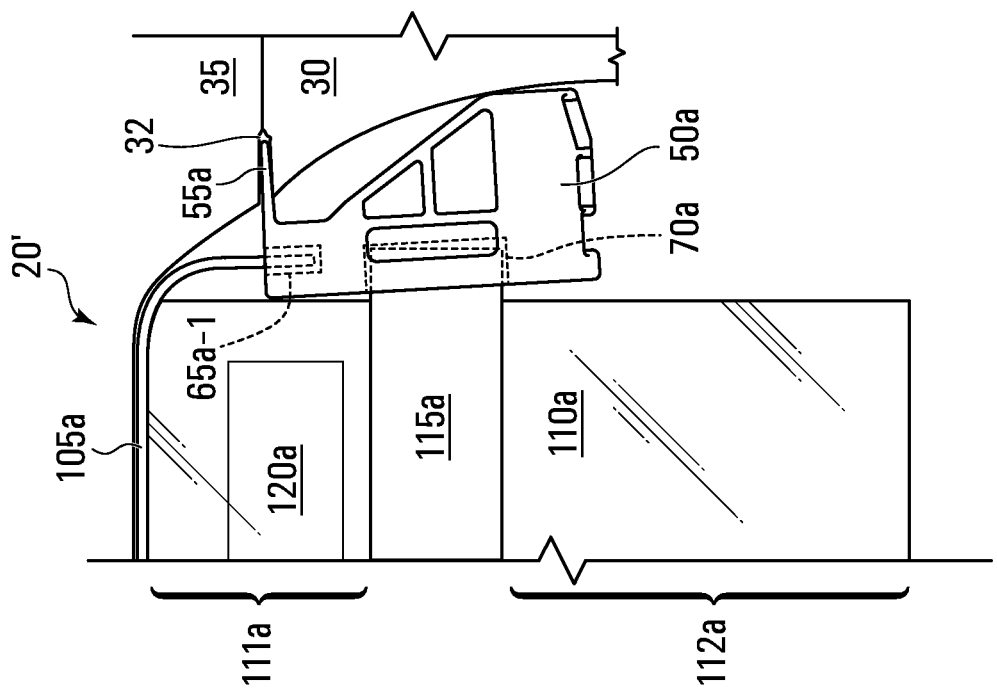
FIG. 4C is zoomed in view of another portion of the apparatus to reduce airflow between occupants in a vehicle shown in FIG. 4A.
Figure 4B:
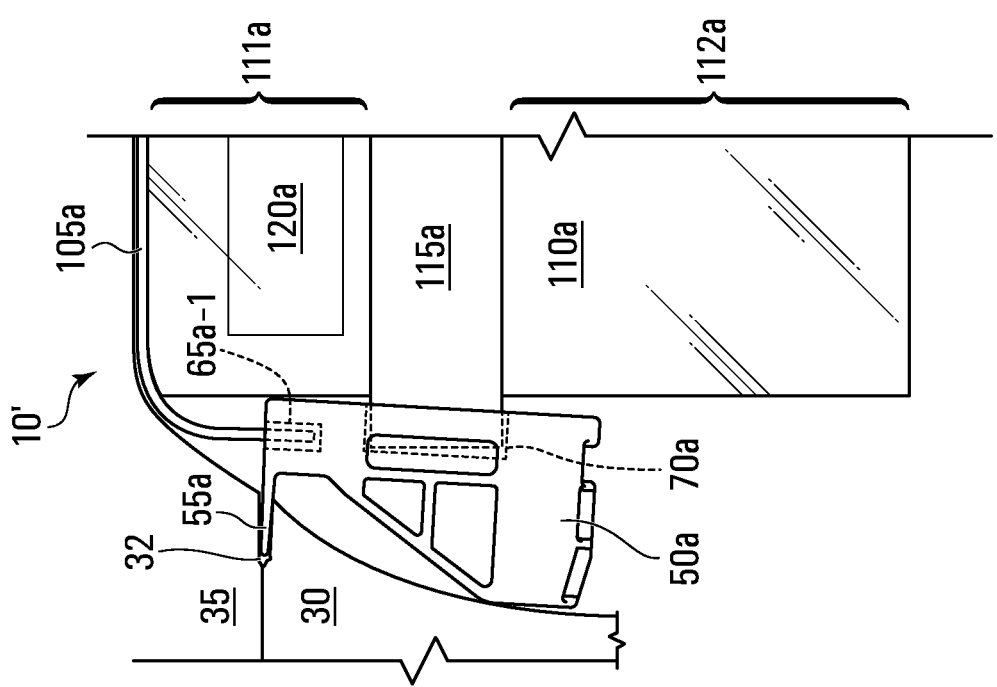
FIG. 4B is zoomed in view of a portion of the apparatus to reduce airflow between occupants in a vehicle shown in FIG. 4A.

Referring to FIGS. 4A, 4B, and 4C, another example of an apparatus 100a to reduce airflow between occupants in a vehicle is shown. Like components of the apparatus 100a bear like reference to their counterparts in the apparatus 100, except followed by the suffix "a". It is to be appreciated that this is another example application of the mount 50a discussed above. In this example, the lip 55a of the mount 50a is inserted into the gap between the interior panel 30 around a B-pillar of an automobile and the headliner 35 of the automobile. When the lip 55a is inserted into the gap, the surface 60a rests against the interior panel 30 to secure the mount 50a in place. In the present example, the mounts 50a are disposed on opposite B-pillars of an automobile and used to support a support member 105a and a rod 115a.

In the present example, the support member 105a is to support an upper portion 111a of the barrier structure 110a and the rod 115a is to support a lower portion 112a of the barrier structure 110a. The combination of the support member 105a and the rod 115a allow for a heavier barrier structure 110a to be suspended. The manner by which the barrier structure 110a attaches to the rod 115a is not particularly limited and may be similar to those discussed above in connection with the support member 105a. In other examples, the barrier structure 110a may include multiple pieces, such as an upper portion 111a hanging from the support member 105a and a lower portion 112a hanging from the rod 115a. In other examples, the barrier structure may be a unitary shield having an upper portion 111a secured to the support member 105a and loops or other connectors to attach to the rod 115a so that the rod 115a may support the additional weight of the lower portion 112a of the barrier structure 110a when the support member 105a alone would not be able to support it.

In the present example, a message center 120a may be disposed on the upper portion 111a of the barrier structure 110a. The message center 120a is not particularly limited and may be an electronic message center 120a where information may be provided to an occupant. For example, the message may include weather information, news, details about the destination, vehicle information, such as speed and/or heading, advertisements, or a combination of any of the above. The manner by which the message center 120a receives content is not particularly limited and may include a wireless network connection, such as Wi-Fi or through a cellular data connection. In other examples, the message center 120a may be a static board that is inserted into a pocket or attached using other means such as a clip, hook-and-pile fastener, or magnetic fastener to provide any of the information mentioned above. In such an example, the message center 120a may be manually changed from time to time.

Furthermore, the lower portion 112a of the barrier structure may include a storage compartment 125a. The storage compartment 125a is not limited and may be a pocket or pouch to store items to be accessible to an occupant. For example, the storage compartment 125a may be used to store business cards or other marketing material for a passenger in a vehicle to take or review. In other examples, the lower portion 112a may also include a message center to display messages.

In addition to increasing the amount of weight that may be supported by the apparatus 100a, the rod 115a may be a telescoping rod with a biasing element, such as a spring, disposed therein. Accordingly, the rod 115a may apply a force against the mounts 50a to enhance the securing of the mounts 50a to the interior panel 30 as well as push the lip 55a further into the gap 32.

Figure 5A:
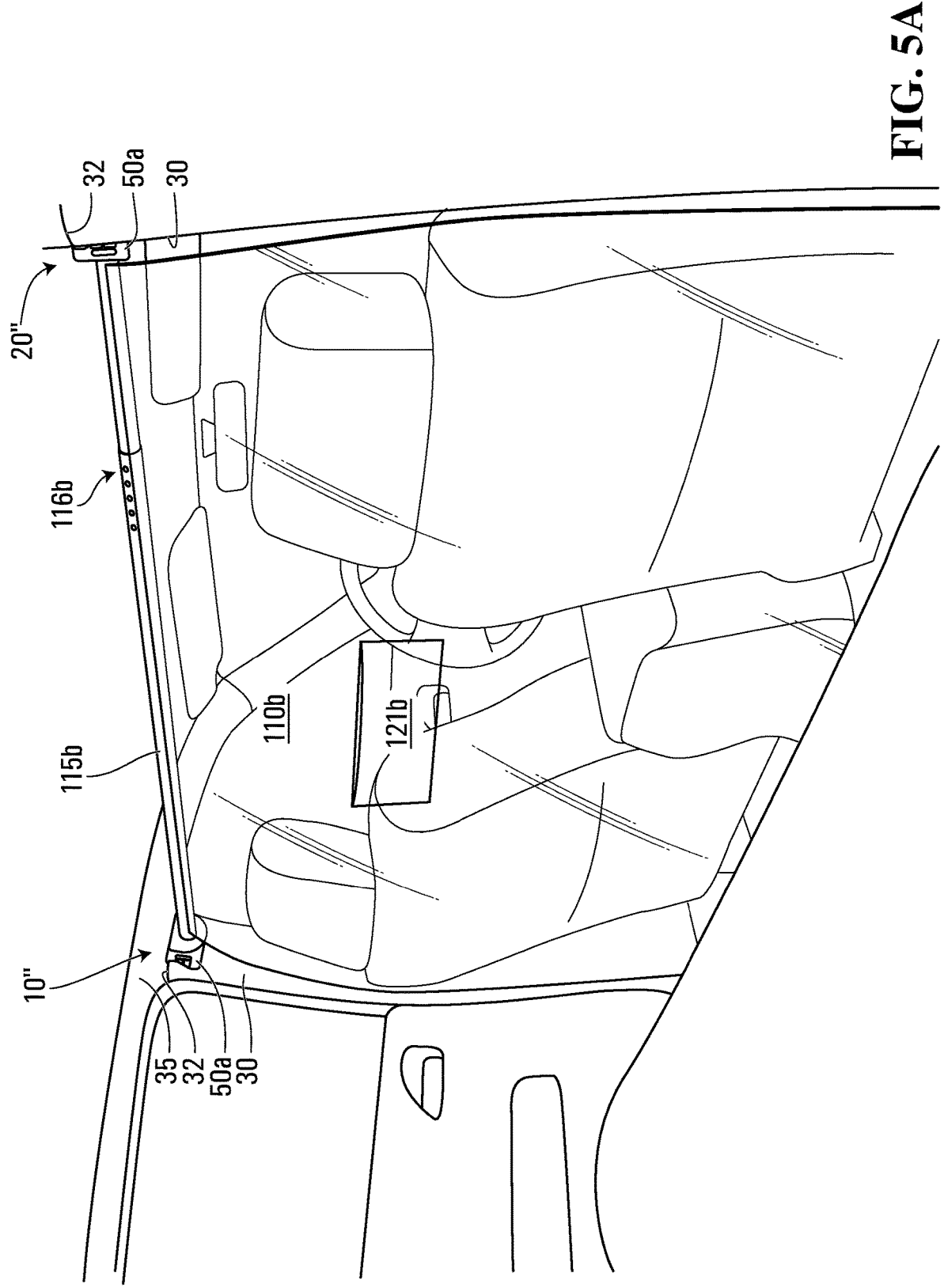
FIG. 5A is a representation of another example of an apparatus to reduce airflow between occupants in a vehicle.
Figure 5C:
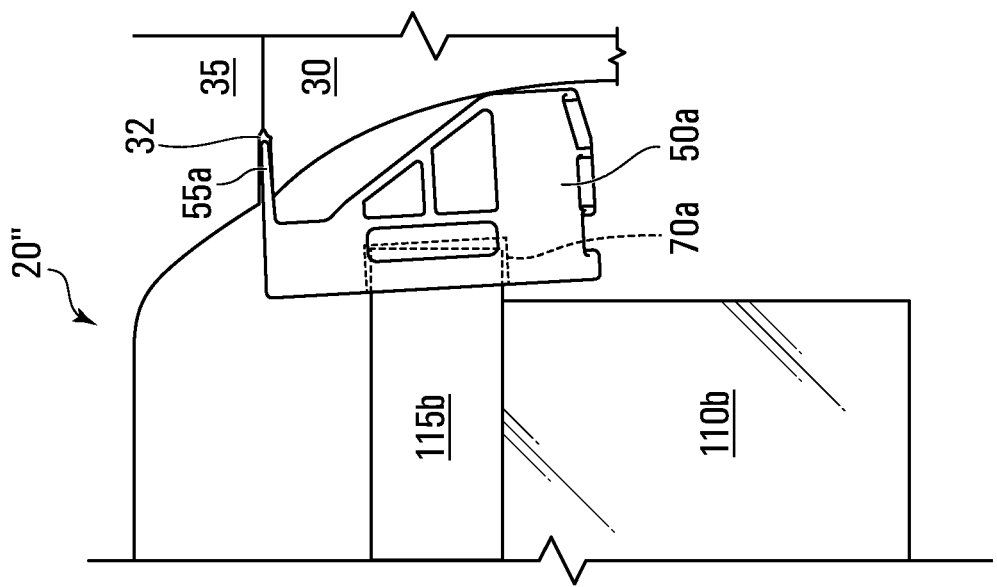
FIG. 5C is zoomed in view of another portion of the apparatus to reduce airflow between occupants in a vehicle shown in FIG. 5A.
Figure 5B:
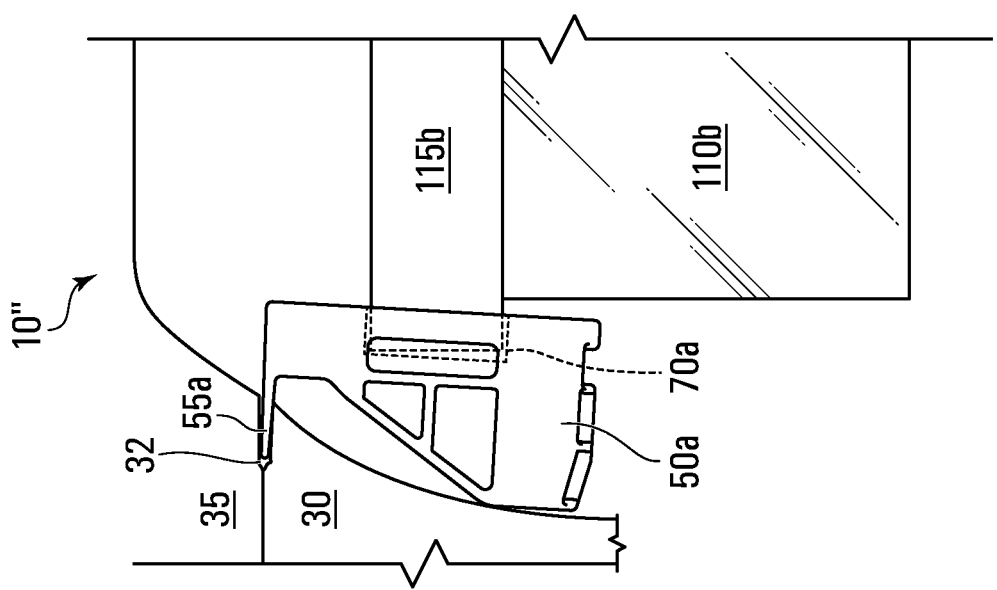
FIG. 5B is zoomed in view of a portion of the apparatus to reduce airflow between occupants in a vehicle shown in FIG. 5A.

Referring to FIGS. 5A, 5B, and 5C, another example of an apparatus 100b to reduce airflow between occupants in a vehicle is shown. Like components of the apparatus 100b bear like reference to their counterparts in the apparatus 100, except followed by the suffix "b". It is to be appreciated that this is another example application of the mount 50a discussed above. In this example, the lip 55a of the mount 50a is inserted into the gap 32 between the interior panel 30 around a B-pillar of an automobile and the headliner 35 of the automobile. When the lip 55a is inserted into the gap, the surface 60a rests against the interior panel 30 to secure the mount 50a in place. In the present example, the mounts 50a are disposed on opposite B-pillars of an automobile and used to support the rod 115b.

In the present example, the rod 115b is to support the barrier structure 110b. The manner by which the barrier structure 110b attaches to the rod 115b is not particularly limited and may be similar to those discussed above. In other examples, the barrier structure 110b loops or holes to engage the rod 115b. It is to be appreciated that the apparatus 100b does not extend up to the headliner 35. However, by using the rod 115b, the apparatus may be easier to install and remove from a vehicle.

The rod 115b is adjustable in length in the present example to accommodate vehicles with different passenger compartment dimensions. Accordingly, the apparatus 100b may be installed into different vehicles. The manner by which the rod 115b adjusts its length is not particularly limited. For example, the rod 115b may have telescoping parts that can be fixed using a ball lock 116b. In other examples, the rod 115b may include a biasing element, such as a spring, disposed therein to push the ends of the rod 115b against the mounts 50a.

Furthermore, the apparatus 100b may include a message center 121b. The message center 121b is not particularly limited and may be an electronic message center 121b where information may be provided to an occupant in the rear seat of the vehicle. The message center 121b may be a static board that is inserted into a pocket or attached using other means such as a clip, hook-and-pile fastener, or magnetic fastener to provide any of the information mentioned above. In this example, the message center 121b may be manually changed from time to time. For example, the message may include vehicle information, such as something provided by the driver of a car for hire to passengers. Other information may include weather information, news, details about the destination, vehicle information, such as speed and/or heading, advertisements, or a combination of any of the above. In other examples, the message center 121b may receive messages electronically, such as via a wireless network connection, such as Wi-Fi or through a cellular data connection.

It is to be appreciated that the apparatus 100b may include variations such as additional features. For example, the apparatus 100b may serve as a be installed between a driver and passengers in a car for hire. Accordingly, features such as the message center 121b may be on either or both sides of the barrier structure 110b. In addition, the barrier structure 110b may include a microphone and speaker to provide clear communication through the barrier structure 110b without airflow. In addition, the barrier structure 110b may include an access hole to allow for items to be passed therethrough, such as payment and/or information, such as receipts and business cards.

Figure 6A:
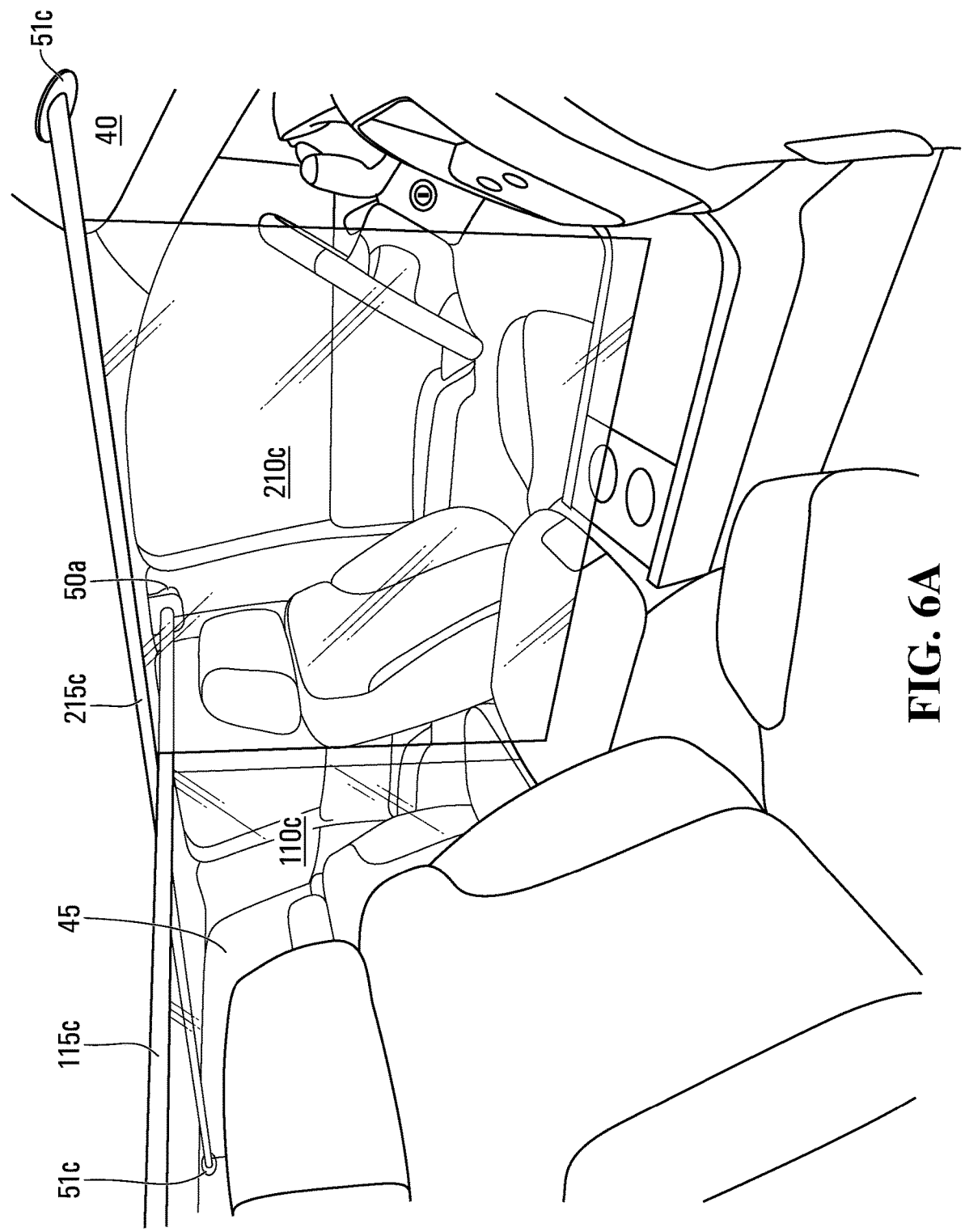
FIG. 6A is a representation of another example of an apparatus to reduce airflow between occupants in the same row of a vehicle.
Figure 6B:
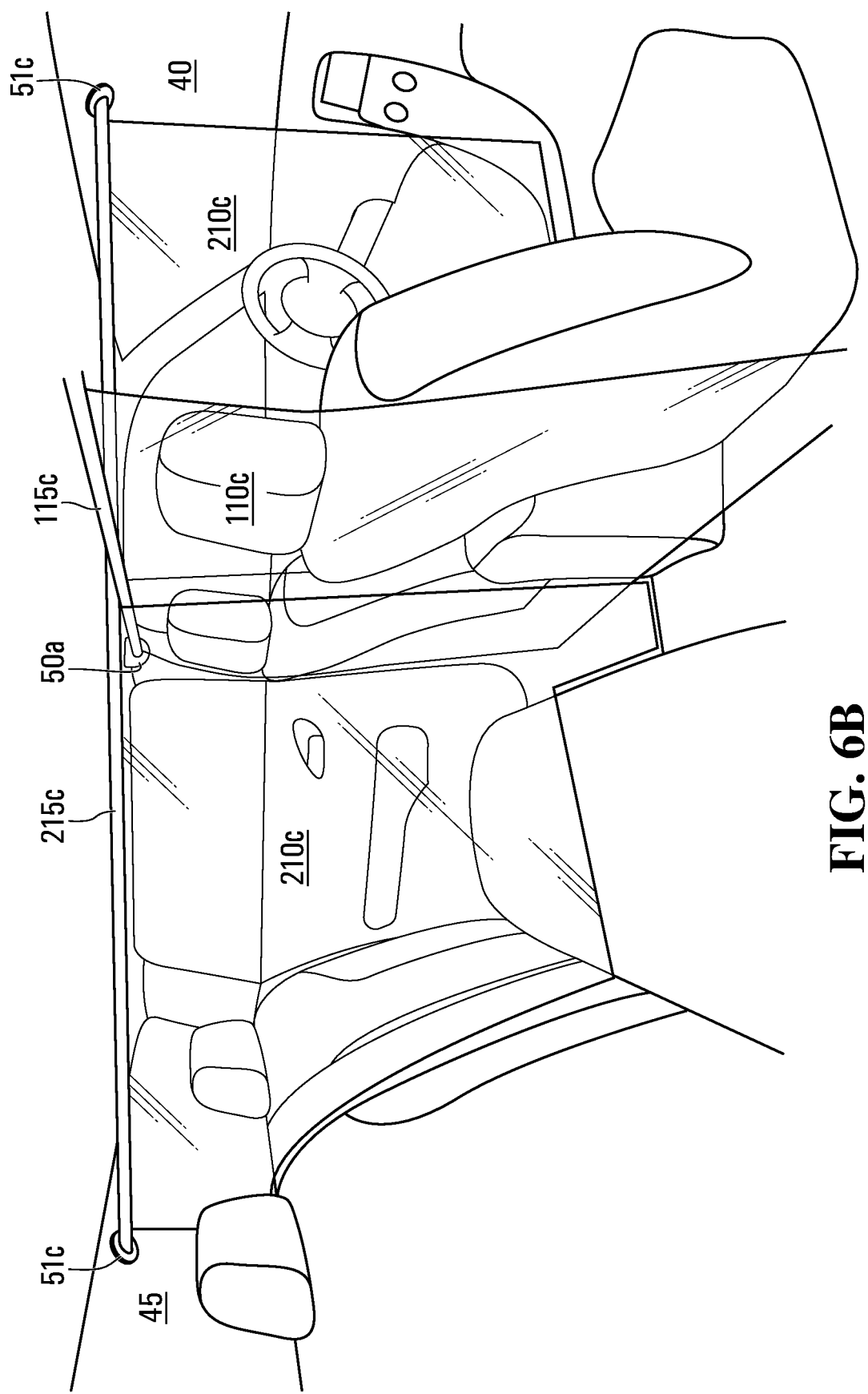
FIG. 6B is another view of the example of an apparatus shown in FIG. 6A.

Referring to FIGS. 6A and 6B, another example of an apparatus 100c to reduce airflow between occupants in a vehicle is shown. Like components of the apparatus 100c bear like reference to their counterparts in the apparatus 100, except followed by the suffix "c". It is to be appreciated that this is another example application of the mounts 50a discussed above. In this example, the apparatus 100c is installed in a vehicle, such as a passenger car. The mounts 50a, the rod 115c and the barrier structure 110c are substantially similar to the corresponding structures from the apparatus 100b to separate two rows, such as the front row and the rear row of seating in the vehicle. In addition, the apparatus 100c includes another rod 215c supported by mounts 51c.

In the present example, the mounts 51c are to be mounted on the front windshield 40 and rear window 45 of the vehicle. The manner by which the mounts 51c are secured to the front windshield 40 and rear window 45 is not particularly limited. In the present example, the mounts 51c include a suction device to attached to the glass. In other examples, the mounts 51c may use adhesives or electrostatic forces. In further examples, the mounts 51c may be substituted with the mount 50a using an adhesive or fastening mechanism to secure it to the front windshield 40 and the rear window 45, or close to the front windshield 40 and the rear window 45.

The rod 215c is to support the barrier structure 210c. The manner by which the barrier structure 210c attaches to the rod 215c is not particularly limited and may be similar to those discussed above in connection with the barrier structure 110c. In the present example, the rod 215c is mounted substantially perpendicular to the rod 115c. Accordingly, the barrier structure 210c will be mounted substantially perpendicular to the barrier 110c. The manner by which the barrier structure 210c is mounted is not particularly limited. In the present example, the rod 115c passes below the rod 215c. Therefore, the barrier structure 210c may include a slit or cutout to allow the rod 115c and the barrier structure 110c to pass therethrough. In other examples, the rod 115c passes above the rod 215c such that the barrier structure 110c may include a slit or cutout to allow the rod 215c and the barrier structure 210c to pass therethrough. In further examples, the barrier structure 210c may include two panels, one on each side of the barrier structure 110c.

It is to be appreciated by a person of skill with the benefit of this description that the barrier structure 110c and the barrier structure 210c separate the passenger compartment of a vehicle into four areas. In a four seat vehicle, each seat may be separated such that a full car would have all occupants separated by a barrier to reduce airflow between the occupants. In larger vehicles, such as a vehicle with an additional row or more seating in a row, additions barriers may be added, such as on a C-pillar. Furthermore, in some examples, the barrier structure 210c may not extend along the entire length of the passenger compartment. For example, the barrier structure may be in place only between the front seats when the back seats are not in use, or vice versa, such as when sharing public transportation like a taxi or other car for hire with a stranger.

Figure 7:
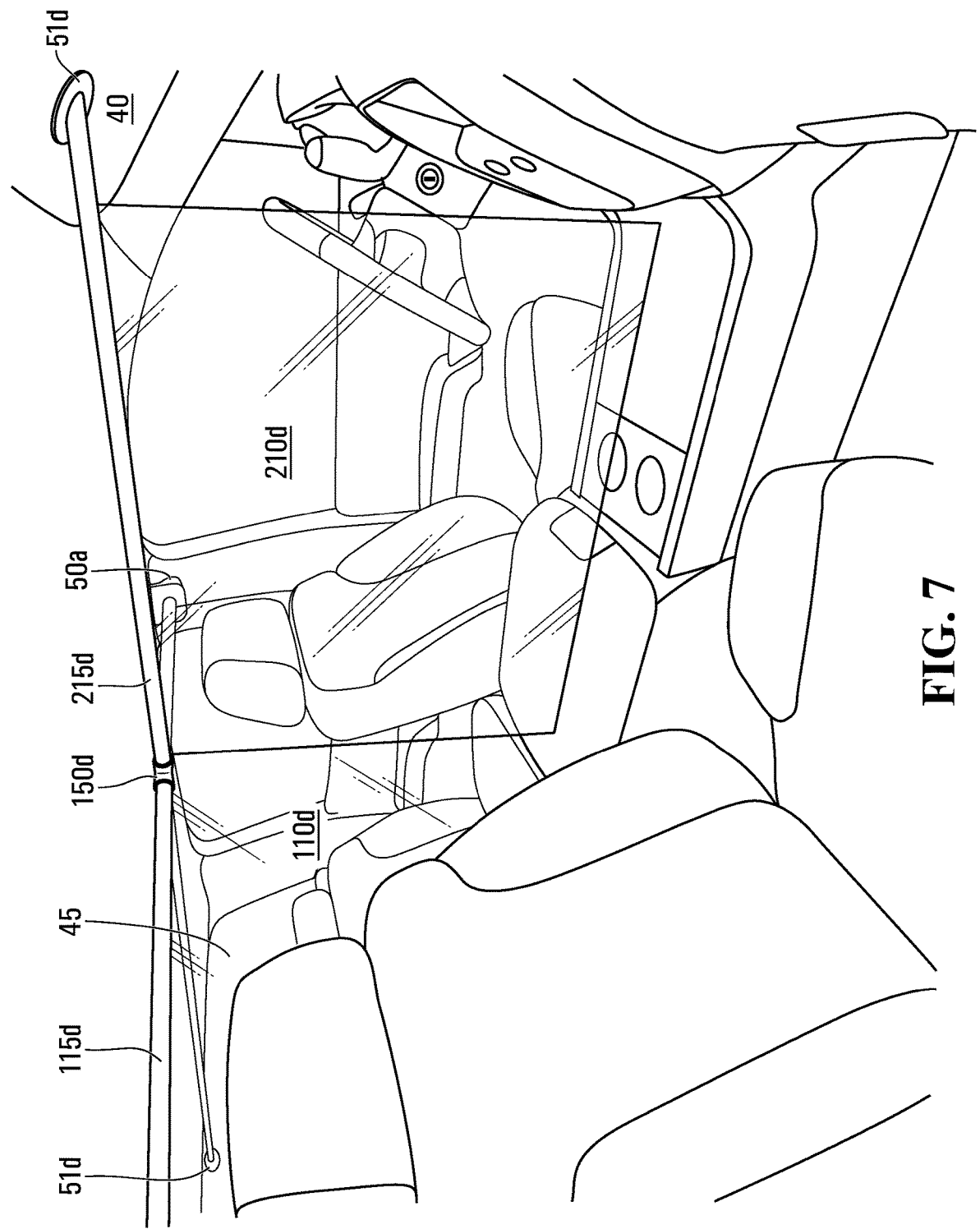
FIG. 7 is a representation of another example of an apparatus to reduce airflow between occupants in the same row of a vehicle.

Referring to FIG. 7, another example of an apparatus 100d to reduce airflow between occupants in a vehicle is shown. Like components of the apparatus 100d bear like reference to their counterparts in the apparatus 100c, except followed by the suffix "d". It is to be appreciated that this is another example application of the mounts 50a discussed above. In this example, the apparatus 100d is installed in a vehicle, such as a passenger car. The mounts 50a, the rod 115d and the barrier structure 110d are substantially similar to the corresponding structures from the apparatus 100d to separate two rows, such as the front row and the rear row of seating in the vehicle. In the present example, the apparatus 100d includes another rod 215d supported by mounts 51d. Instead of passing over the rod 115d, the rod 215d and the rod 115d are connected with a joint 150d. The barrier structure 110d and the barrier structure 210d are substantially similar to their counterparts 110c and 210c.

Figure 8:
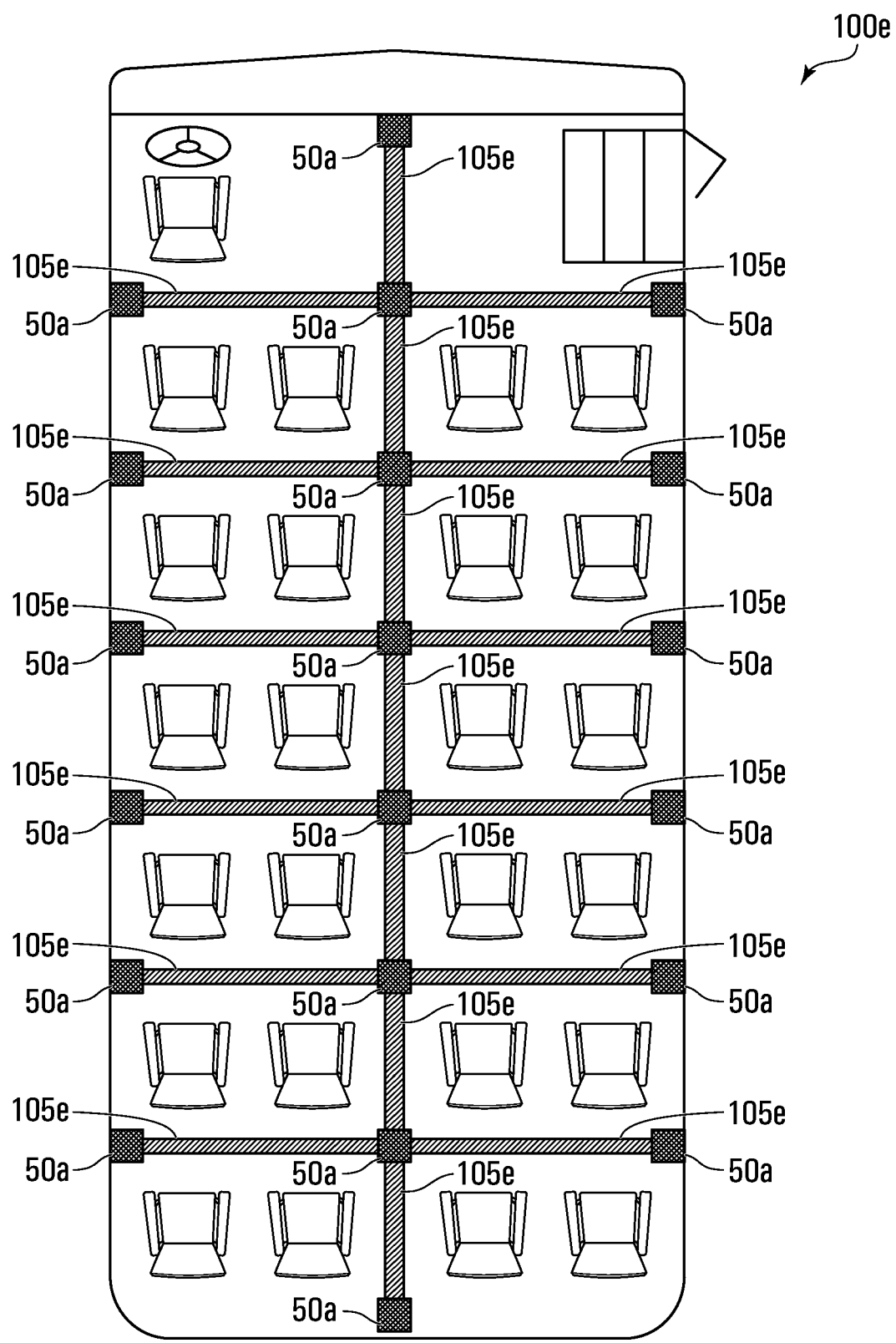
FIG. 8 is a schematic representation of another example of an apparatus to reduce airflow between occupants in a large vehicle.

Referring to FIG. 8, a schematic representation of another example of an apparatus 100e to reduce airflow between occupants in a large vehicle, such as a bus is shown. Like components of the apparatus 100e bear like reference to their counterparts in the apparatus 100, except followed by the suffix "e". It is to be appreciated that this is another example application of the mount 50a discussed above. In this example, a larger number of mounts 50a are installed in a large vehicle. As illustrated, the plurality of mounts 50a may support a network of ribs 105b through the vehicle. It is to be appreciated by a person of skill with the benefit of this description that a barrier structure (not shown) may be suspended from each of the ribs 105b to separate occupants in the various seats. Furthermore, it is to be understood that the large vehicle is not particularly limited and may include other types of vehicles such as a plane, a ship, subway, or a train.

Furthermore, it is to be appreciated by a person of skill with the benefit of this description that the layout of the ribs 105b is not limited and may include variations. For example, additional ribs 105b may be placed between each seat to support another barrier structure to further separate occupants of the large vehicle. In other examples, some ribs 105b may be omitted to allow for more open sections for larger groups of occupants who are not to be separated.

Figure 9:
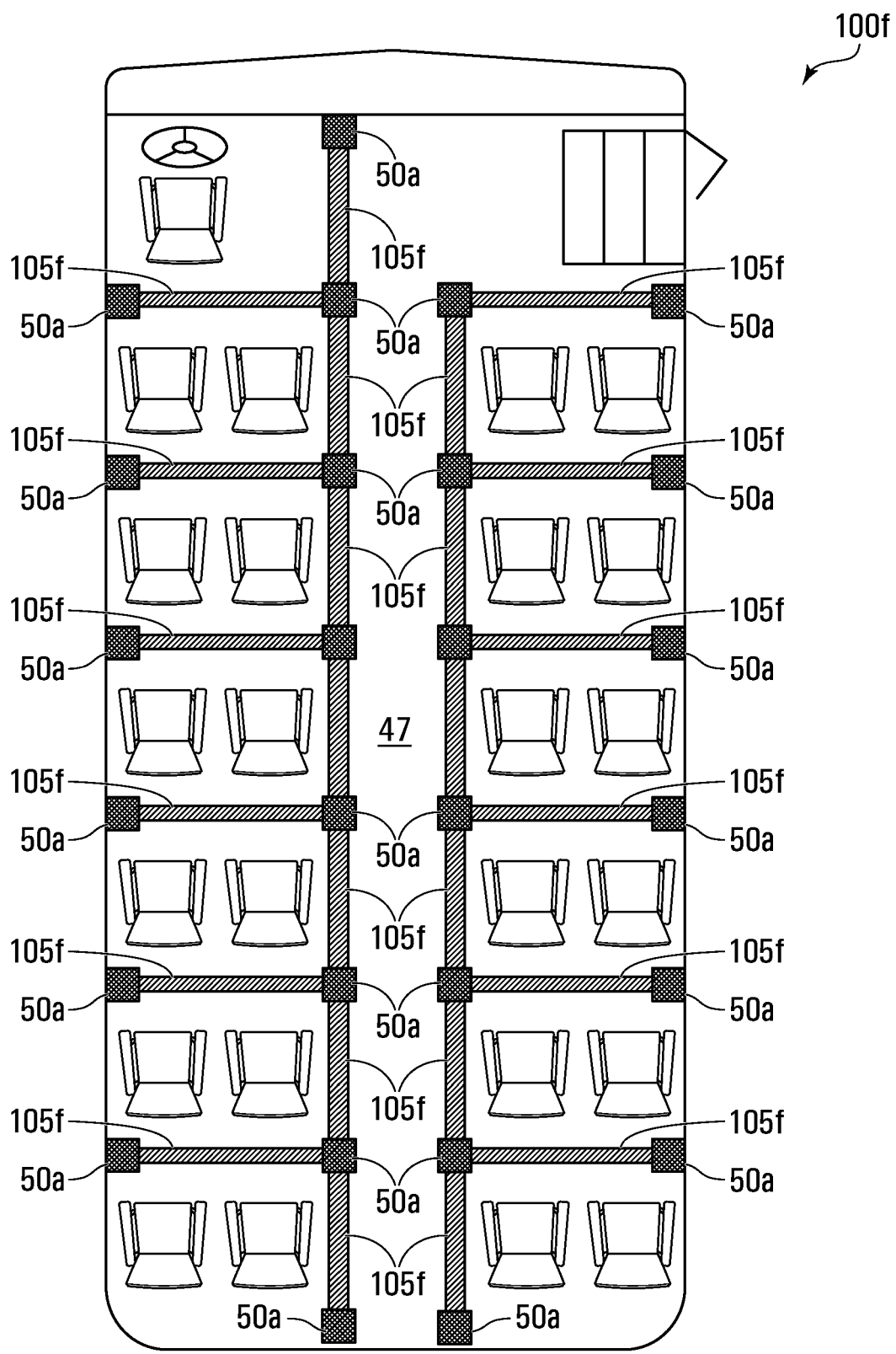
FIG. 9 is a schematic representation of another example of an apparatus to reduce airflow between occupants in a large vehicle with an aisle.

Variations are contemplated. For example, FIG. 9 shows another apparatus 100f to reduce airflow between occupants in a vehicle. As shown in the apparatus 100f, an additional set of ribs 105f is installed to provide an aisle 47 for passengers to walk down in cases to allow passengers to exit and board the vehicle at different times, such as on a public bus or train.

Figure 10:
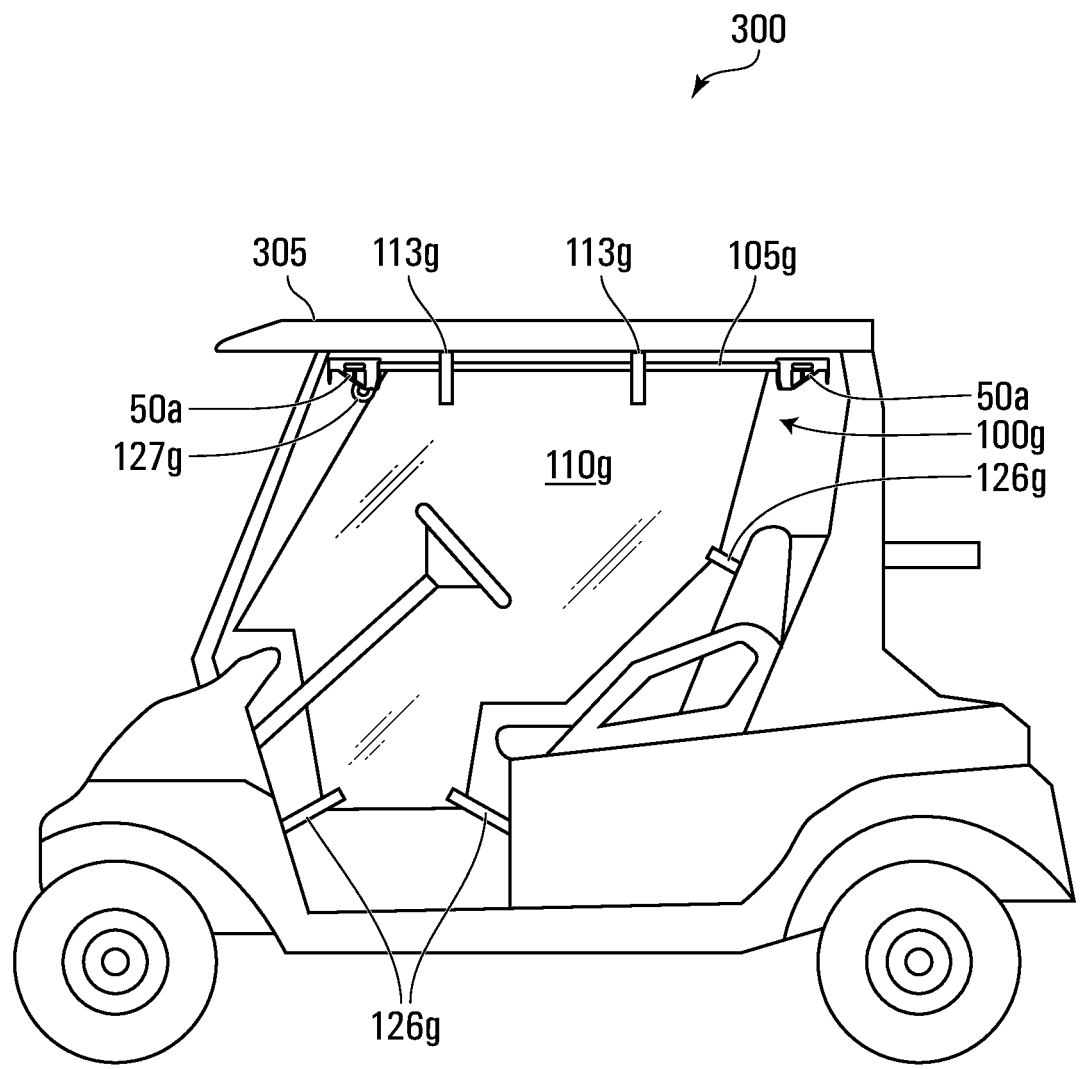
FIG. 10 is a schematic representation of an example of a vehicle with an apparatus to reduce airflow between occupants.

Referring to FIG. 10, a schematic representation of a vehicle 300 with another example of an apparatus 100g to reduce airflow between occupants is shown. Like components of the apparatus 100g bear like reference to their counterparts in the apparatus 100, except followed by the suffix "g". It is to be appreciated that this is another example application of the mount 50a discussed above.

In the present example, the vehicle 300 may be a golf cart having an open air passenger compartment to accommodate two occupants, such as a driver and a passenger. In other examples, the vehicle 300 may have additional rows to carry more passengers. The vehicle 300 includes a roof 305 to cover the passenger compartment, which may provide some protection from the elements, primarily sunlight or rain. In addition, the vehicle 300 includes an equipment compartment behind the passenger compartment to carry equipment such as golf clubs. In other examples, the vehicle 300 may be used to transport people over longer distances, such as on a corporate campus, movie studio, airport, stadium, etc.

In this example, the mounts 50a are attached to the roof 305 of the vehicle 300 by applying a hook-and-pile fastener over the depression 70a. It is to be appreciated that in this configuration, the depression 65a-4 may be used to receive a support member 105g that extends along the length of the passenger compartment of the vehicle 300. In some examples, each of the mount 50a may be rotated 90° or 180° to use other depressions 65a to receive the support member 105g. The support member 105g is to suspend a barrier structure 110g between the occupants of the vehicle 300. The manner by which the barrier structure 110g is suspended is not particularly limited and may include those discussed above in connection with the apparatus 100a.

Figure 11:
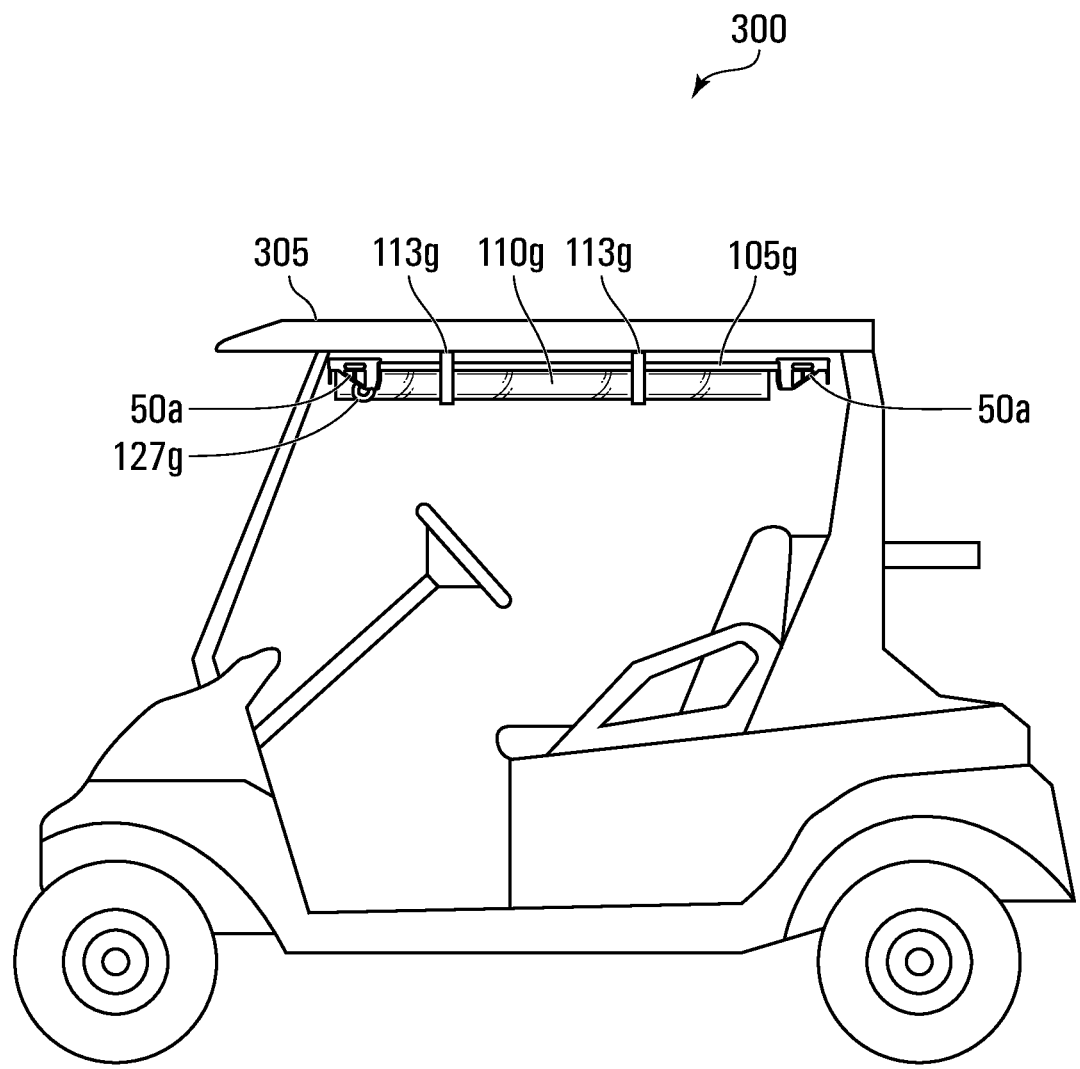
FIG. 11 is a schematic representation of the vehicle shown in FIG. 10 with the apparatus in another configuration.

In the present example, barrier straps 113g are disposed on the roof 305 of the vehicle 300. The barrier straps 113g are to secure the barrier structure 110g when rolled up as shown in FIG. 11 to open the space between the occupants in the passenger compartment or when the vehicle 300 is carrying a single passenger. The manner by which the barrier straps 113g secure the barrier structure is not particularly limited and may include a button, clip, anchor or other means of fastening the ends of the strap to the roof 305 of the vehicle 300. It is to be appreciated that the barrier straps 113g are optional and may not be present in other examples. In other examples, an external strap may be used to secure the barrier structure. In particular, an external strap may be used to pass through multiple vehicles to hold the barrier structure 110g up with a single strap, such as when the vehicles are lined up in a service facility. Accordingly, the barrier structures 110g of multiple vehicles may be moved away so that each of the golf carts may be serviced and/or sanitized between uses.

In the present example, the apparatus 100g may also include anchors 126g to tie down the barrier structure 110g to reduce movement during operation of the vehicle 300 since the passenger compartment is open. In addition, the anchors 126g may also reduce movement due to wind. The anchors 126g are not particularly limited and may be placed at various positions to restrict movement of the barrier structure 110g, which may be flexible. For example, there may be more or less than three anchors 126g in other vehicles. In addition, the anchors 126g may be made from any material that is mechanically strong enough to withhold the forces that would be exerted by a barrier structure 110g catching wind. For example, the anchors 126g may be made from a biasing material, such as a bungee cord, or be a simple strap, rope or chain having a hook-and-pile fastener mechanism. It is to be appreciated by a person of skill in the art with the benefit of this description that additional anchors 126g may be added at other locations, such as near the top of the barrier structure 110g to further support the weight of the barrier structure 110g or to replace the mounts 50a and the support member 105g.

In the present example, an additional ring 127g may be added to a mount 50a. In this example, the ring 127g may pass through a hole (not shown) in the mount 50a that may have been pre-drilled. The ring 127g is not particularly limited and may be used to support various peripheral equipment associated with the apparatus 100g or the vehicle 300. As an example, the ring 127g may be used to attach a cable or rope used to tie down the barrier structure 110g.

Figure 12:
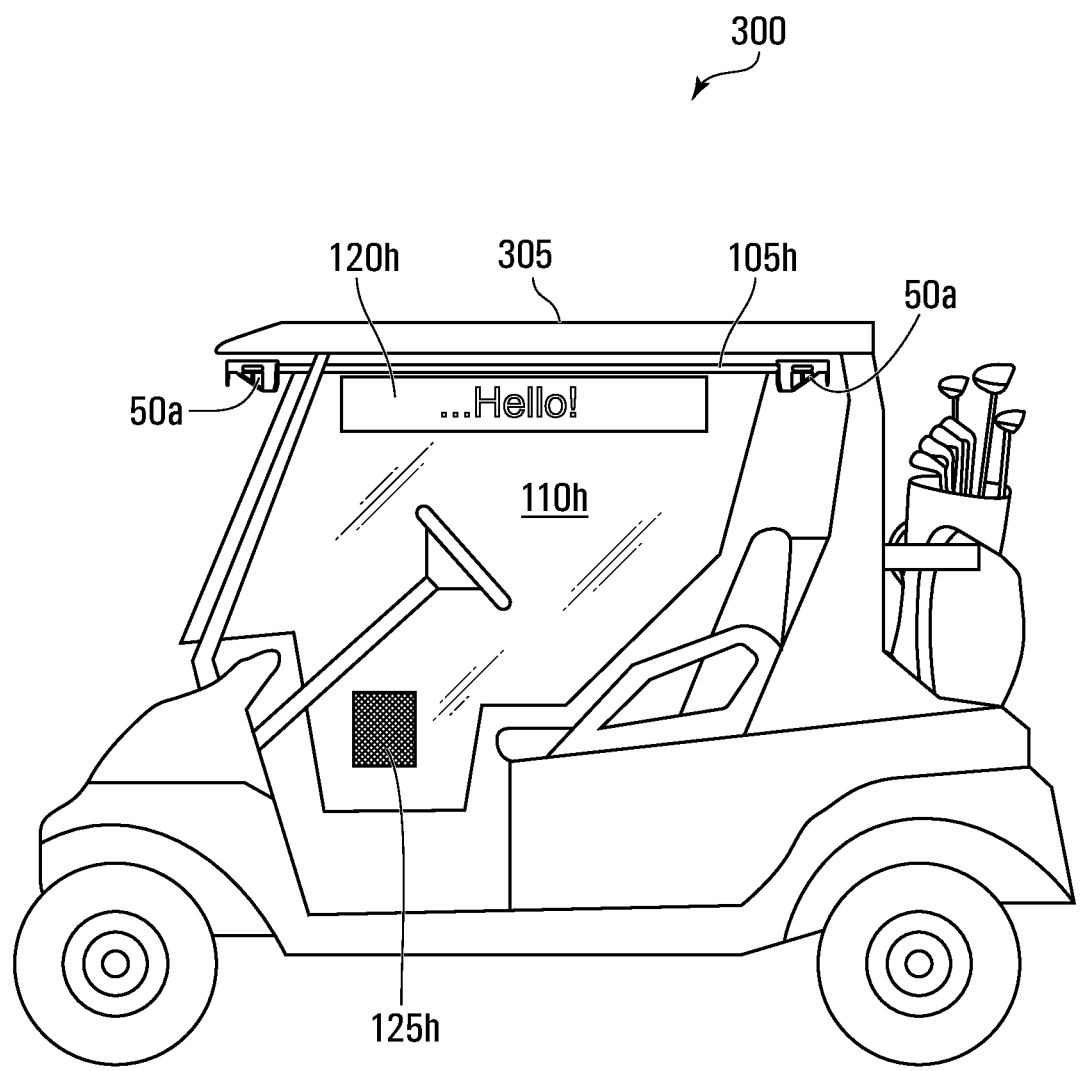
FIG. 12 is a schematic representation of another example of a vehicle with an apparatus to reduce airflow between occupants.

Referring to FIG. 12, a schematic representation of a vehicle 300 with another example of an apparatus 100h to reduce airflow between occupants is shown. Like components of the apparatus 100h bear like reference to their counterparts in the apparatus 100, except followed by the suffix "h". In the present example, an additional message center 120h may be added to the barrier structure 110h. The message center 120h is not particularly limited and may be an electronic message center 120h where information may be provided to an occupant. For example, the message may include weather information, news, details about a golf hole, golf score, communication messages between other people in your golf party or the clubhouse, advertisements, or a combination of any of the above. In other examples, the message center 120h may be a static board that is inserted into a pocket or attached using other means such as a clip, hook-and-pile fastener, or magnetic fastener. In such an example, the message center 120h may be manually or automatically changed from time to time. In particular, the message center 120h may be updated via a network connection and may include ads being pushed to the message center 120h via a wireless connection.

In the present example, the barrier structure 110h may further include a storage compartment 125h. The storage compartment 125h is not limited and may be used by an occupant to store a wallet or mobile phone. It is to be appreciated that although one storage compartment 125h is shown, other examples may have additional pockets. Furthermore, placing a weight, such as in the storage compartment 125h, near the lower portion of the barrier structure 110h may provide addition stability and reduce the effects of wind on the barrier structure 110h. Furthermore, the storage compartments 125h may be made from a clear or translucent material to provide an indication that the storage compartment 125h contains contents to reduce the probability that a user will forget their mobile device or other personal belongings. The storage compartment 125h may also include drain holes and be washable such that it may be cleaned and/or sanitized between each user. In the present example, the storage compartment 125h is a pocket. In other examples, the storage compartment 125h may be replaced with another storage mechanism such as a clip, a hook, a hanger, or hole from which personal items may be suspended and add weight near the lower portion of the barrier structure 110h.

Figure 13:
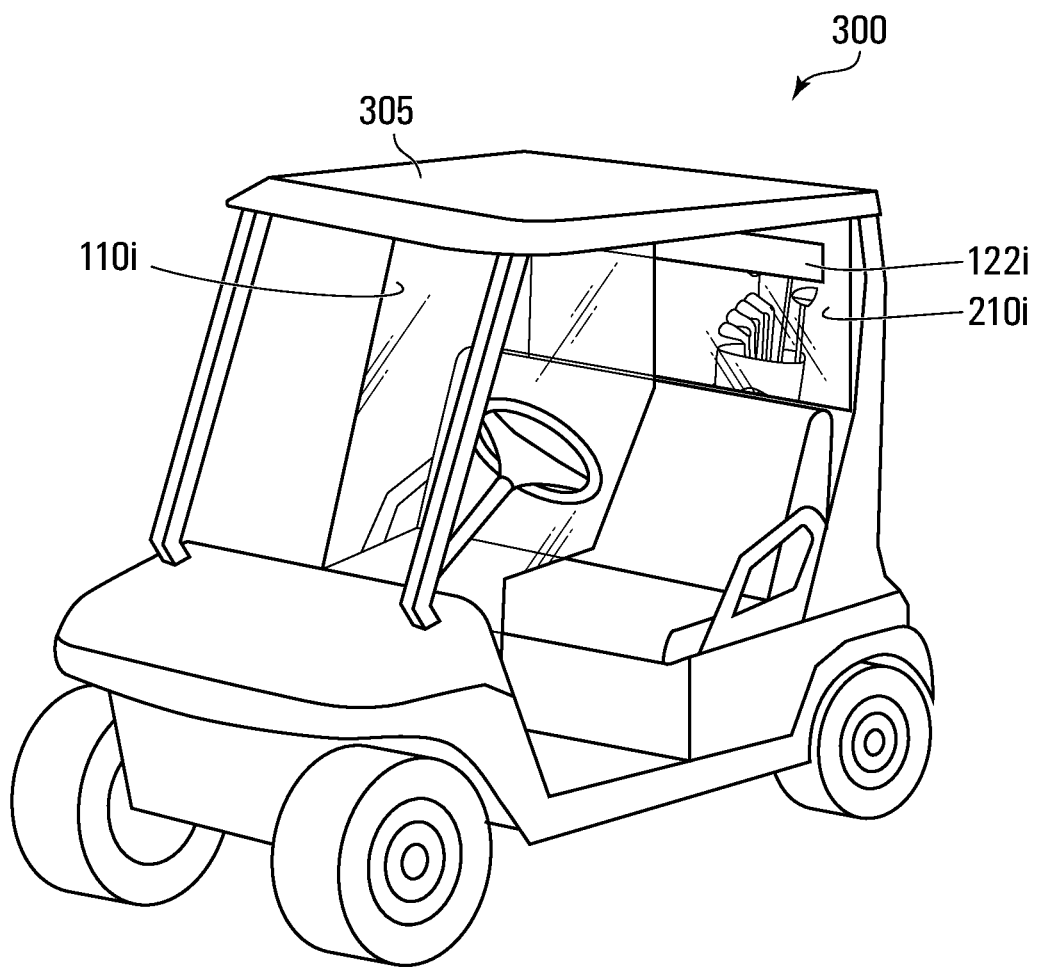
FIG. 13 is a schematic representation of another example of a vehicle with an apparatus to reduce airflow between occupants.

Referring to FIG. 13, a schematic representation of a vehicle 300 with another example of an apparatus 100i to reduce airflow between occupants is shown. Like components of the apparatus 100i bear like reference to their counterparts in the apparatus 100, except followed by the suffix "i". It is to be appreciated that this is another example application of the mount 50a discussed above.

In the present example, the apparatus 100i includes a barrier structure 110i and a second barrier structure 210i. The barrier structure 210i mounted to the roof 305 to separate the passenger compartment from the equipment compartment. In other examples, the barrier structure 210i may be mounted to another suitable location of the vehicle 300, such as the side frame. It is to be appreciated by a person of skill in the art with the benefit of this description that during a game of golf, a player often moves to an area behind the equipment compartment to select a golf club. During this process, the occupant may continue conversation with the occupant still in the passenger compartment. Accordingly, the barrier structure 210i is to reduce airflow in this common situation as well.

The barrier structure 210i is not particularly limited and may include additional features such as a message center 122i. The message center 122i is not particularly limited may be substantially similar to the message center 120h. Accordingly, a golfer standing behind the vehicle 300 may read relevant information on the message center 122i while selecting equipment from the equipment compartment, such as a golf club, while protecting the occupant in the passenger compartment. In further examples, the barrier structure 210i may also include storage pockets.

It should be recognized that features and aspects of the various examples provided above may be combined into further examples that also fall within the scope of the present disclosure.

What is claimed is:

1. A mount comprising:
   a body;
   a lip formed from the body, wherein the lip is to be inserted into a gap;
   a surface of the body to brace against a wall;
   a first depression into the body to receive a first support member; and
   a second depression into the body to receive a second support member, wherein at least one of the first support member and the second support member are to support a barrier structure.

2. The mount of claim 1, wherein the first depression is to receive a first end of the first support member to support an upper portion of the barrier structure.

3. The mount of claim 1, wherein the second depression is to receive a second end of the second support member to support a lower portion of the barrier structure.

4. The mount of claim 1, wherein the gap is formed between a first interior panel of a vehicle and the wall, wherein the wall is a second interior panel of the vehicle.

5. The mount of claim 4, wherein the first interior panel is a headliner.

6. The mount of claim 4, wherein the second interior panel is a B-pillar.

7. The mount of any claim 1, wherein the lip is removably secured within the gap.

8. The mount of claim 7, wherein the lip is to friction fit within the gap.

9. An apparatus comprising:
   a first mount to secure in a vehicle, wherein the first mount is a first body including a first lip to insert into a first gap, a first surface to brace against a first wall, and first depressions into the first body;
   a second mount to secure in the vehicle, wherein the second mount is a second body including a second lip to insert into a second gap, a second surface to brace against a second wall, and second depressions into the second body, wherein the second gap is opposite the first gap and the second wall is opposite the first wall;
   a support member supported by one of the first depressions of the first mount at a first end and by one of the second depressions of the second mount at a second end; and
   a barrier structure supported by the support member wherein the barrier structure is to separate a first occupant of the vehicle from a second occupant of the vehicle.

10. The apparatus of claim 9, further comprising a rod supported by the first mount and the second mount, wherein the rod is to support a lower portion of the barrier structure, and wherein the support member is to support an upper portion of the barrier structure.

11. The apparatus of claim 10, wherein the upper portion of the barrier structure includes a messaging center.

12. The apparatus of claim 10, wherein the lower portion of the barrier structure includes a storage compartment.

13. The apparatus of claim 9, wherein the first gap is formed between a first interior panel of the vehicle and the first wall, and wherein the second gap is formed between a second interior panel of the vehicle and the second wall.

14. The apparatus of claim 13, wherein the first interior panel and the second interior panel are a headliner of the vehicle.

15. The apparatus of claim 13, wherein the first wall is a first panel mounted on a first B-pillar of the vehicle and the second wall is a second panel mounted on a second B-pillar of the vehicle.

16. The apparatus of claim 9, wherein the first mount is removably secured within the first gap.

17. The apparatus of claim 16, wherein and the second mount is removably secured within the second gap.

18. A vehicle comprising:
   a passenger compartment to carry a plurality of occupants in a first row and a second row, wherein the first row includes a first left seat and a first right seat, and wherein the second row includes a second left seat and a second right seat;
   a first barrier structure to separate the first row from the second row; and
   a second barrier structure mounted substantially perpendicular to the first barrier structure to separate a first side from a second side, wherein the second barrier structure extends from a front windshield to a rear window of the passenger compartment.

19. The vehicle of claim 18, wherein the first barrier structure includes a messaging center.

* * * * *